United States Patent
Wise (10) Patent No.: US 6,326,999 B1
(45) Date of Patent: Dec. 4, 2001

(54) DATA RATE CONVERSION

(75) Inventor: Adrian Philip Wise, Bristol (GB)

(73) Assignee: Discovision Associates, Irvine, CA (US)

( * ) Notice: Subject to any disclaimer, the term of this patent is extended or adjusted under 35 U.S.C. 154(b) by 0 days.

(21) Appl. No.: 08/516,038

(22) Filed: Aug. 17, 1995

(30) Foreign Application Priority Data

Aug. 23, 1994 (GB) .................................................. 9417138

(51) Int. Cl.$^7$ .............................. H04N 7/01; H04N 11/20
(52) U.S. Cl. ........................... 348/441; 348/443; 348/458
(58) Field of Search ................................... 348/441, 443, 348/458, 459, 445, 97; H04N 7/01, 11/20

(56) References Cited

U.S. PATENT DOCUMENTS

| 3,893,042 | 7/1975 | Whitman et al. ...................... 331/55 |
| 3,962,685 | 6/1976 | Belle Isle .......................... 340/172.5 |
| 4,107,780 | 8/1978 | Grimsdale et al. .................. 364/521 |
| 4,142,205 | 2/1979 | Iinuma .................................. 358/13 |
| 4,149,242 | 4/1979 | Pirz ...................................... 364/200 |

(List continued on next page.)

FOREIGN PATENT DOCUMENTS

| 0196911 | 10/1986 | (EP) . | |
| 0255767 | 2/1988 | (EP) . | |
| 0468480 | 1/1992 | (EP) . | |
| 0564145 | 10/1993 | (EP) . | H04N/7/01 |
| 0572262 | 12/1993 | (EP) . | |
| 0572263 | 12/1993 | (EP) . | |
| 0576749 | 1/1994 | (EP) . | |
| 0589734 | 3/1994 | (EP) . | |
| 0639032 | 2/1995 | (EP) . | |
| 2045035 | 10/1980 | (GB) . | |
| 2059724 | 4/1981 | (GB) . | |
| 2171578 | 8/1986 | (GB) . | |
| 2194085 | 2/1988 | (GB) . | |
| 2268035 | 12/1993 | (GB) . | |
| 2269070 | 1/1994 | (GB) . | |
| 9315586 | 8/1993 | (WO) | ............................... H04N/7/01 |
| 9524100 | 9/1995 | (WO) | ............................... H04N/7/01 |

OTHER PUBLICATIONS

Foley, J.D. et al. "Breshman's Line Algorithm" Electrochemistry, Proceedings of the First Conference Held in Sydney Feb. 1963. J.A. Friend and F. Gutmann Jan. 1, 1982 pp. 433–436, XP000563829.

(List continued on next page.)

Primary Examiner—Andrew Faile
Assistant Examiner—Vivek Srivastava
(74) Attorney, Agent, or Firm—Keiji Masaki; Steve Wong; Richard Stokey (57) ABSTRACT

A method for converting frame data at a slower rate into field data at a faster rate in a video decoder comprises determining a basic field repetition rate such that a field is repeated an integer number of times in a frame period, calculating a ratio differential of the repetition rate by subtracting from the speed-up ratio of the faster to the slower rate, the ratio of the fields per frame period to the slower rate, comparing the ratio differential with the differential of the field repetition rate and adding or subtracting extra fields when the two are substantially at variance.

7 Claims, 5 Drawing Sheets

U.S. PATENT DOCUMENTS

| | | | |
|---|---|---|---|
| 4,196,448 | 4/1980 | Whitehouse et al. | 358/135 |
| 4,215,369 | 7/1980 | Iijima | 358/146 |
| 4,302,775 | 11/1981 | Widergren et al. | 358/136 |
| 4,334,246 | 6/1982 | Saran | 358/261 |
| 4,433,308 | 2/1984 | Hirata | 331/17 |
| 4,437,072 | 3/1984 | Asami | 331/1 A |
| 4,442,503 * | 4/1984 | Schutt et al. | 364/900 |
| 4,495,629 | 1/1985 | Zaslo et al. | 377/70 |
| 4,540,903 | 9/1985 | Cooke et al. | 307/465 |
| 4,580,066 | 4/1986 | Berndt | 307/276 |
| 4,630,198 | 12/1986 | I Yuan | 364/200 |
| 4,646,151 | 2/1987 | Welles, II et al. | 358/149 |
| 4,679,163 | 7/1987 | Arnould et al. | 364/725 |
| 4,689,823 * | 8/1987 | Wojcik et al. | 382/41 |
| 4,692,880 * | 9/1987 | Merz et al. | 364/521 |
| 4,747,070 | 5/1988 | Trottier et al. | 364/900 |
| 4,785,349 | 11/1988 | Keith et al. | 358/136 |
| 4,789,927 | 12/1988 | Hannah | 364/200 |
| 4,799,056 * | 1/1989 | Hattori et al. | 340/799 |
| 4,799,677 | 1/1989 | Frederiksen | 273/1 E |
| 4,807,028 * | 2/1989 | Hatori et al. | 358/133 |
| 4,823,201 | 4/1989 | Simon et al. | 358/133 |
| 4,829,465 | 5/1989 | Knauer et al. | 364/725 |
| 4,831,440 | 5/1989 | Borgers et al. | 358/133 |
| 4,831,441 * | 5/1989 | Ando | 348/441 |
| 4,866,510 | 9/1989 | Goodfellow et al. | 358/13 |
| 4,866,637 | 9/1989 | Gonzalez-Lopez et al. | 364/518 |
| 4,887,224 | 12/1989 | Okano et al. | 364/518 |
| 4,891,784 | 1/1990 | Kato et al. | 364/900 |
| 4,903,018 | 2/1990 | Wiebach et al. | 341/51 |
| 4,912,668 | 3/1990 | Aubie et al. | 364/725 |
| 4,922,341 | 5/1990 | Strobach | 358/136 |
| 4,924,298 | 5/1990 | Kitamura | 358/12 |
| 4,924,308 | 5/1990 | Feuchtwanger | 358/133 |
| 4,975,596 | 12/1990 | Roberts et al. | 307/272.2 |
| 4,991,112 | 2/1991 | Callemyn | 364/518 |
| 5,003,204 | 3/1991 | Cushing et al. | 307/465 |
| 5,027,212 | 6/1991 | Marlton et al. | 358/183 |
| 5,038,209 | 8/1991 | Hang | 358/136 |
| 5,053,985 | 10/1991 | Friedlander et al. | 364/725 |
| 5,057,793 | 10/1991 | Cowley et al. | 331/1 A |
| 5,060,242 | 10/1991 | Arbeiter | 375/122 |
| 5,081,450 | 1/1992 | Lucas et al. | 340/728 |
| 5,086,489 | 2/1992 | Shimura | 382/56 |
| 5,091,721 | 2/1992 | Harnori | 340/727 |
| 5,107,345 | 4/1992 | Lee | 358/432 |
| 5,111,292 | 5/1992 | Kuriacose et al. | 358/133 |
| 5,113,255 | 5/1992 | Nagata et al. | 358/136 |
| 5,122,873 | 6/1992 | Golin | 358/133 |
| 5,122,875 | 6/1992 | Raychaudhuri et al. | 358/133 |
| 5,124,790 | 6/1992 | Nakayama | 358/133 |
| 5,126,842 | 6/1992 | Andrews et al. | 358/133 |
| 5,129,059 | 7/1992 | Hannah | 395/166 |
| 5,130,568 | 7/1992 | Miller et al. | 307/272.2 |
| 5,134,487 | 7/1992 | Taguchi et al. | 358/209 |
| 5,134,697 | 7/1992 | Scheffler | 395/425 |
| 5,136,371 | 8/1992 | Savatier et al. | 358/133 |
| 5,136,695 * | 8/1992 | Goldschlag et al. | 395/275 |
| 5,142,380 | 8/1992 | Sakagami et al. | 358/432 |
| 5,146,325 | 9/1992 | Ng | 358/135 |
| 5,146,326 | 9/1992 | Hasegawa | 358/135 |
| 5,148,271 | 9/1992 | Kato et al. | 358/133 |
| 5,148,524 | 9/1992 | Harlin et al. | 395/166 |
| 5,151,875 | 9/1992 | Sato | 364/784 |
| 5,159,449 | 10/1992 | Allmendinger | 358/136 |
| 5,161,221 * | 11/1992 | Van Nostrand | 395/425 |
| 5,164,819 | 11/1992 | Music | 358/13 |
| 5,168,356 | 12/1992 | Acampora et al. | 358/133 |
| 5,168,375 | 12/1992 | Reisch et al. | 358/432 |
| 5,172,011 | 12/1992 | Leuthold et al. | 307/272.2 |
| 5,174,641 * | 12/1992 | Lim | 358/141 |
| 5,175,617 | 12/1992 | Wallace et al. | 358/133 |
| 5,179,372 | 1/1993 | West et al. | 340/799 |
| 5,182,642 | 1/1993 | Gersdorff et al. | 358/133 |
| 5,184,124 | 2/1993 | Molpus et al. | 341/50 |
| 5,185,819 | 2/1993 | Ng et al. | 382/56 |
| 5,189,526 | 2/1993 | Sasson | 358/432 |
| 5,191,548 | 3/1993 | Balkanski et al. | 364/725 |
| 5,193,002 | 3/1993 | Guichard et al. | 358/133 |
| 5,201,056 | 4/1993 | Daniel et al. | 395/800 |
| 5,202,847 | 4/1993 | Bolton et al. | 364/725 |
| 5,212,549 | 5/1993 | Ng et al. | 358/135 |
| 5,212,742 | 5/1993 | Normile et al. | 382/56 |
| 5,214,507 | 5/1993 | Aravind et al. | 358/133 |
| 5,216,724 | 6/1993 | Suzuki et al. | 382/7 |
| 5,221,966 | 6/1993 | Clayton et al. | 358/140 |
| 5,223,926 | 6/1993 | Stone et al. | 358/133 |
| 5,227,878 | 7/1993 | Puri et al. | 358/136 |
| 5,228,098 | 7/1993 | Crinon et al. | 382/56 |
| 5,229,863 | 7/1993 | Kao et al. | 358/426 |
| 5,231,484 | 7/1993 | Gonzales et al. | 358/133 |
| 5,231,486 | 7/1993 | Acampora et al. | 358/133 |
| 5,233,420 | 8/1993 | Piri et al. | 358/149 |
| 5,233,690 | 8/1993 | Sherlock et al. | 395/165 |
| 5,237,413 | 8/1993 | Israelsen et al. | 358/160 |
| 5,241,222 | 8/1993 | Small et al. | 307/449 |
| 5,241,383 | 8/1993 | Chen et al. | 358/136 |
| 5,241,658 | 8/1993 | Masterson et al. | 395/162 |
| 5,247,612 | 9/1993 | Quinard | 395/166 |
| 5,249,146 | 9/1993 | Uramoto et al. | 364/725 |
| 5,253,058 | 10/1993 | Gharavi | 358/136 |
| 5,253,078 | 10/1993 | Balkanski et al. | 358/426 |
| 5,257,213 | 10/1993 | Kim et al. | 364/725 |
| 5,257,223 | 10/1993 | Dervisoglu | 365/154 |
| 5,257,350 | 10/1993 | Howard et al. | 395/162 |
| 5,258,725 | 11/1993 | Kinoshita | 331/17 |
| 5,260,781 | 11/1993 | Soloff et al. | 358/133 |
| 5,260,782 | 11/1993 | Hui | 358/133 |
| 5,260,787 * | 11/1993 | Capitant et al. | 348/441 |
| 5,261,047 | 11/1993 | Rivshin | 395/163 |
| 5,263,136 | 11/1993 | DeAguiar et al. | 395/164 |
| 5,267,334 | 11/1993 | Normille et al. | 382/56 |
| 5,276,513 | 1/1994 | van der Wal et al. | 358/136 |
| 5,276,681 | 1/1994 | Tobagi et al. | 370/85.4 |
| 5,276,784 | 1/1994 | Ohki | 395/127 |
| 5,278,520 | 1/1994 | Parker et al. | 331/1 A |
| 5,278,646 | 1/1994 | Civaniar et al. | 358/133 |
| 5,278,647 | 1/1994 | Hingorani et al. | 358/136 |
| 5,283,646 | 2/1994 | Bruder | 348/415 |
| 5,287,178 | 2/1994 | Acampora et al. | 348/384 |
| 5,287,193 | 2/1994 | Lin | 358/261.1 |
| 5,287,420 | 2/1994 | Barrett | 382/56 |
| 5,289,276 | 2/1994 | Siracusa et al. | 348/467 |
| 5,289,577 | 2/1994 | Gonzales et al. | 395/163 |
| 5,293,229 | 3/1994 | Iu | 348/415 |
| 5,294,894 | 3/1994 | Gebara | 331/1 A |
| 5,298,896 | 3/1994 | Lei et al. | 341/51 |
| 5,298,992 | 3/1994 | Pietras et al. | 348/415 |
| 5,299,025 | 3/1994 | Shirasawa | 358/400 |
| 5,300,949 | 4/1994 | Rodriguez et al. | 345/202 |
| 5,301,019 | 4/1994 | Citta | 348/416 |
| 5,301,032 | 4/1994 | Hong et al. | 358/261.2 |
| 5,301,040 | 4/1994 | Hoshi et al. | 358/465 |
| 5,301,136 | 4/1994 | McMillan, Jr. et al. | 364/725 |
| 5,301,242 | 4/1994 | Gonzales et al. | 382/56 |
| 5,301,272 | 4/1994 | Atkins | 395/165 |
| 5,303,342 | 4/1994 | Edge | 395/164 |
| 5,304,953 | 4/1994 | Heim et al. | 331/1 A |
| 5,305,438 | 4/1994 | MacKay et al. | 395/164 |
| 5,309,527 | 5/1994 | Ohki | 382/56 |
| 5,311,309 | 5/1994 | Ersoz et al. | 348/409 |

| | | | | |
|---|---|---|---|---|
| 5,317,398 | * | 5/1994 | Casavant et al. | 348/441 |
| 5,319,460 | * | 6/1994 | Kubo | 348/715 |
| 5,321,806 | * | 6/1994 | Meinerth et al. | 395/162 |
| 5,351,047 | | 9/1994 | Behlen | 341/67 |
| 5,357,606 | * | 10/1994 | Adams | 395/164 |
| 5,369,418 | * | 11/1994 | Richards | 345/185 |
| 5,392,071 | * | 2/1995 | Richards et al. | 348/398 |
| 5,398,071 | * | 3/1995 | Gore et al. | 348/443 |
| 5,430,488 | * | 7/1995 | Hedley | 348/446 |
| 5,453,792 | * | 9/1995 | Giffored et al. | 348/441 |
| 5,461,679 | * | 10/1995 | Normile et al. | 395/650 |
| 5,495,291 | * | 2/1996 | Adams | 348/390 |
| 5,502,494 | * | 3/1996 | Auld | 348/426 |
| 5,553,005 | * | 9/1996 | Voeten et al. | 364/514 |
| 5,568,165 | * | 10/1996 | Kimura | 345/185 |
| 5,572,691 | * | 11/1996 | Koudmani | 3995/405 |
| 5,577,203 | * | 11/1996 | Reinert et al. | 345/200 |

OTHER PUBLICATIONS

Kinuhata, K. and Hideo Yamamoto. "Analysis of Field Correspondence and Field Memory Capacity in TV Standard Conversion." Electronics and Communications in Japan, 10/74 USA vol. 57 No. 10 pp. 56–63 XP002047538.

Yamamoto, Hideo and K. Kinuhata. "Analysis of Field Correspondence and Field Memory Capacity in TV Standard Conversion." Abstracts—Transactions of the Institute of Electronics and Communications Engineers of Japan, vol. 57 No. 10 10/74 pp. 14–15 XP002047539.

Chong. "A Data Flow Architecture For Digital Image Processing," WesconTech. Papers No. 4/6. Oct. 30, 1984, Anaheim, California, USA, pp. 1–10.

P. Yip, et al., "DIT and DIF Algorithm for Discrete Sine and Cosine Transforms" Proceedings of the International Symposium on Circuits and Systems, IEEE Press, New York, US, vol. 2/3, Jun. 5, 1985, Kyoto, JP, pp. 941–944.

Hsieh S. Hou. "A Fast Recursive Algorithm for Computing the Discrete Cosine Transform," IEEE Transactions on Acoustics, Speech, and Signal Processing, vol. 35, No. 10, Oct. 1987, IEEE Press, New York, US. pp. 1455–1461.

Komori et al., An Elastic Pipeline Mechanism By Self-–Timed Circuits, IEEE Journal Of Solid–State Circuits. vol. 23, No. 1, 2/88, New York, NY, USA, pp. 111–117.

A. Gupta et al., "A Fast Recursive Algorithm for the Discrete Sine Transform,"IEEE Transactions on Acoustics, Speech, and Signal Processing, vol. 38, No. 3, Mar. 1990, IEEE Press, New York, US. pp. 553–557.

H.R. Wu, et al., "A Two–Dimensional Fast Cosine Transform Algorithm Based on Hou's Approach," IEEE Transaction on Acoustics, Speech, and Signal Processing, vol. 39, No. 2, Feb. 1991, IEEE Press, New York, US, pp. 544–546.

* cited by examiner

FIG. 6 excellent.

DATA RATE CONVERSION

CROSS REFERENCE TO RELATED APPLICATIONS

The following U.S. patent application have subject matter related to this application: application Ser. No. 08/382,958, filed Feb. 2, 1995; Ser. No. 08/400,397, filed Mar. 7, 1995; Ser. No. 08/399,851 filed Mar. 7, 1995; Ser. No. 08/482,296, filed Jun. 7, 1995; Ser. No. 08/486,396, filed Jun. 7, 1995; application Ser. No. 08/484,730, filed Jun. 7, 1995 (now U.S. Pat. No. 5,677,648); Ser. No. 08/479,279, filed Jun. 7, 1995; Ser. No. 08/483,020, filed Jun. 7, 1995; Ser. No. 08/487,224, filed Jun. 7, 1995; Ser. No. 08/400,722, filed Mar. 7, 1995 (now U.S. Pat. No. 5,596,517); Ser. No. 08/400,723, filed Mar. 7, 1995 (now U.S. Pat. No. 5,594, 678); Ser. No. 08/404,067, filed Mar. 14, 1995 (now U.S. Pat. No. 5,590,067); Ser. No. 08/567,555, filed Dec. 5, 1995 (now U.S. Pat. No. 5,617,458); Ser. No. 08/396,834, filed Mar. 1, 1995; Ser. No. 08/473,813, filed Jun. 7, 1995; Ser. No. 08/484,456, filed Jun. 7, 1995; Ser. No. 08/476,814, filed Jun. 7, 1995; Ser. No. 08/481,561, filed Jun. 7, 1995; Ser. No. 08/482,281, filed Jun. 7, 1995; Ser. No. 08/479,910, filed Jun. 7, 1995; Ser. No. 08/475,729, filed Jun. 7, 1995; Ser. No. 08/484,578, filed Jun. 7, 1995; Ser. No. 08/473,615, filed Jun. 7, 1995; Ser. No. 08/487,356, filed Jun. 7, 1995; Ser. No. 08/487,134, filed Jun. 7, 1995; Ser. No. 08/481,772, filed Jun. 7, 1995; Ser. No. 08/481,785, filed Jun. 7, 1995 (now U.S. Pat. No. 5,703,793); Ser. No. 08/486,908, filed Jun. 7, 1995; Ser. No. 08/486,034, filed Jun. 7, 1995; Ser. No. 08/487,740, filed Jun. 7, 1995; Ser. No. 08/488,348, filed Jun. 7, 1995; Ser. No. 08/484,170, filed Jun. 7, 1995; Ser. No. 08/516,038, filed Aug. 17, 1995; Ser. No. 08/399, 810, filed Mar. 7, 1995 (now U.S. Pat. No. 5,625,571); Ser. No. 08/400,201, filed Mar. 7, 1995 (now U.S. Pat. No. 5,603,012); Ser. No. 08/400,215, filed Mar. 7, 1995; Ser. No. 08/400,072, filed Mar. 7, 1995; Ser. No. 08/402,602, filed Mar. 7, 1995; Ser. No. 08/400,206, filed Mar. 7, 1995; Ser. No. 08/400,151, filed Mar. 7, 1995; Ser. No. 08/400,202, filed Mar. 7, 1995; Ser. No. 08/400,398, filed Mar. 7, 1995; Ser. No. 08/400,161, filed Mar. 7, 1995; Ser. No. 08/400, 141, filed Mar. 7, 1995; Ser. No. 08/400,211, filed Mar. 7, 1995; Ser. No. 08/400,331, filed Mar. 7, 1995; Ser. No. 08/400,207, filed Mar. 7, 1995; Ser. No. 08/399,898, filed Mar. 7, 1995; Ser. No. 08/399,665, filed Mar. 7, 1995; Ser. No. 08/400,058, filed Mar. 7, 1995; Ser. No. 08/399,800, filed Mar. 7, 1995; Ser. No. 08/399,801, filed Mar. 7, 1995; Ser. No. 08/399,799, filed Mar. 7, 1995; Ser. No. 08/474, 222, filed Jun. 7, 1995; Ser. No. 08/486,481, filed Jun. 7, 1995; Ser. No. 08/474,231, filed Jun. 7, 1995; Ser. No. 08/474,830, filed Jun. 7, 1995; Ser. No. 08/474,220, filed Jun. 7, 1995 (now U.S. Pat. No. 5,699,544); Ser. No. 08/473,868, filed Jun. 7, 1995; Ser. No. 08/474,603, filed Jun. 7, 1995; Ser. No. 08/485,242, filed Jun. 7, 1995 (now U.S. Pat. No. 5,689,313); Ser. No. 08/477,048, filed Jun. 7, 1995; and Ser. No. 08/485,744, filed Jun. 7, 1995; Ser. No. 08/850,125, filed May 1, 1997; Ser. No. 08/812,820, filed Mar. 6, 1997; Ser. No. 08/804,620, filed Feb. 24, 1997; application Ser. No. 08/876,720, filed Jun. 16, 1997; Ser. No. 08/903,969, filed Jul. 31, 1997; Ser. No. 08/947,727, filed Sep. 25, 1997; Ser. No. 08/937,143, filed Sep. 24, 1997; Ser. No. 08/946,754, filed Oct. 7, 1997; Ser. No. 08/947,646, filed Oct. 8, 1997; Ser. No. 08/950,892, filed Oct. 15, 1997; Ser. No. 08/955,476, filed Oct. 21, 1997; Ser. No. 08/967, 515, filed Nov. 11, 1997; Ser. No. 08/992,859, filed Dec. 10, 1997.

This invention relates to data rate conversion and particularly, though not exclusively, to video data frame/ field rate conversion.

FIELD OF INVENTION

BACKGROUND OF THE INVENTION

There are various ways of compressing video information. In particular, there are three standards under which compression may be carried out: JPEG, MPEG AND H.261. These are discussed, for example, in U.S. Pat. No. 5,212, 742.

Video information is commonly formatted as a series of fields. The original information which is to be converted into, and displayed in, a video format may not be immediately compatible with the field rate at which the information is to be displayed. For example, a celluloid film is shot at a rate of 24 frame/sec. (24 Hz) while, for example, the NTSC television system has a field rate of almost 60 Hz. The technique of increasing the frame rate of the film images to match that of the television system film rate is known as pulldown conversion.

Continuing with the above example of displaying a film in a NTSC standard format, a '2/3pulldown' conversion could be used in which each film frame is repeated for either two or three consecutive field periods at the video field repetition rate. The number of repetitions alternates so that the first frame is displayed twice in two consecutive field periods, the second frame is displayed three times in three consecutive field periods and so on. Thus, in one second twelve film frames at 24 Hz will each have been generated twice (i.e. for 24 field periods) while the other twelve film frames will each have been generated three times (i.e. for 36 field periods). The total (24+36) equals the 60 fields in one second at a 60 Hz field rate.

Pulldown instructions may be generated remotely and signalled to the video decoder associated with the displaying device or be generated locally at the video decoder. In the signalled pulldown, the encoder performs the pulldown calculations and signals specifically which frames are to be repeated, for example using the 'repeat-first-field' flag in the MPEG-2 video syntax. The decoder simply obeys the remotely generated instructions received.

In local pulldown, the encoder encodes the film information and transmits it to the receiving device. There is no information in the transmitted signal to tell the decoder at the receiving device how to perform the appropriate pulldown conversion (e.g. the '2/3 pulldown' referred to above). The decoder must, therefore, calculate how to perform the appropriate conversion from the transmitted film frame rate to the displayed field rate.

If only pulldown conversion from the 24 Hz frame rate to a 60 Hz field rate were required, the single 2/3 pulldown conversion would be relatively easy to implement. However, other pulldown schemes are required. For example, the 24 Hz film frame rate may need to be converted to a 50 Hz field rate for the PAL television format.

Furthermore, an additional complexity in the NTSC television system is that the actual field rate is not 60 Hz but 60000/1001 Hz. Thus, the regular alternating 2/3 pulldown yields a field rate that is actually too high.

SUMMARY OF THE INVENTION

According to the invention there is provided a method of converting frames of data received at a slower rate into fields of data generated at a faster rate, the method comprising:

- determining a basic integer number of repetitions of fields in a frame period;
- calculating a differential of the field repetition rate from the difference between the ratio of the faster to the slower rates and the ratio of the basic repetition number of fields in the frame period to the slower frame rate;

additionally repeating or deleting selected ones of the repeated fields, when the differential of the rate of repeating fields is substantially at variance with the calculated differential of the field repetition rate, to maintain the repetition of the fields at the faster rate.

The terms 'frame' and 'field' are used for convenience. Both are intended to refer to any frame, field, packet or other discreet quantity of data sent, received and/or constructed as a set. The invention allows the selected repetition rate to be modified by the inclusion or extraction of frames of repeated and, therefore, redundant data to fulfill the faster field data rates. Preferably, the selected basic integer repetition rate is less than the faster field rate. In this case, the method will add additionally repeated frames at the repetition rate. The repetition rate may be less than half the field rate.

The method does not have to select a slower basic integer repetition rate. In the alternative, it could equally well select a faster rate and then the method would be arranged to delete repeated frames where necessary.

The invention also extends to apparatus for converting frames of data received at a slower rate into fields of data generated at a faster rate, the apparatus comprising:

means for determining a basic integer number of repetitions of fields in a frame period;

means for calculating a differential of the field repetition rate from the difference between the ration of the faster to the slower rates and the ratio of the basic repetition number of fields in the frame period to the slower frame rate;

means for additionally repeating or deleting selected ones of the repeated fields, when the differential of the rate of repeating fields is substantially at variance with the calculated differentials of the field repetition rate, to maintain the repetition of the fields at the faster rate.

BRIEF DESCRIPTION OF THE DRAWINGS

The invention may be put into practice in a number of ways, one of which will now be described with reference to the accompanying drawings in which.

DETAILED DESCRIPTION OF THE INVENTION

Preferably, the apparatus includes means for generating a repeat or delete frame signal for actuating the means for repeating or deleting selected ones of the repeated frames.

The present invention provides a generalized solution to the pulldown calculations that allow data at 23.98 Hz, 24 Hz and 25 Hz frame rates to be displayed at 50 Hz field rate and 23.98 Hz, 24 Hz, 25 Hz and 29.97 Hz to be displayed at 59.94 Hz field rate.

Breshenham's line drawing algorithm is a method of drawing lines of arbitrary slope on display devices which are divided into a series of rectangular picture elements (pels). A description of Breshenham's algorithm can be found between pages 433 and 436 of the book 'Fundamentals of Interactive Computer Graphics' by Foley et al., published by Addison-Wesley.

Figure 1:
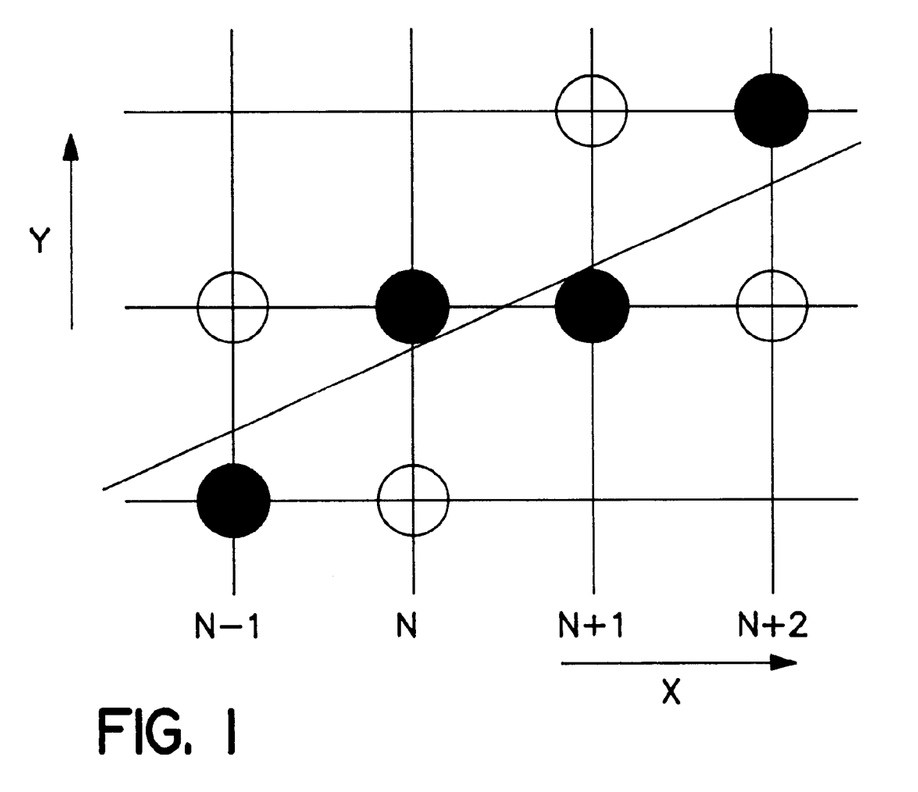
FIG. 1 illustrates Breshenham's line drawing algorithm.

In the line-drawing case illustrated in FIG. 1 (for lines that have a slope between 0 and 1) the algorithm approximates the desired line by deciding, for each co-ordinate in the X axis, which pel in the Y axis is closest to the line. This pel is illuminated or colored in as appropriate for the application.

As the algorithm moves from left to right in the diagram from say (n−1) to (n) it decides whether to select the pel in the same Y coordinate as for (n−1) or whether to increment the Y coordinate. In the diagram the Y coordinate is incremented at (n) and (n+2) but not at (n+1).

The decision of whether or not to increment the Y coordinate is used, in its application to the current invention, in the decision of whether to display the current frame for 3 field periods rather than the normal 2 field periods when deriving a faster field rate from an incoming frame rate in a video decoder.

In the simple case of conversion from 24 Hz frame rate to 60 Hz field rate, the desired speed-up ratio is 60/24. However, the important decision is made in determining whether or not a frame is displayed for three field periods (rather than two field periods) in a frame period. If there were no three field period frames then the 24 Hz frames rate would yield 48 fields. Thus, the ratio of the number of twice repeated fields can be subtracted from the speed-up ratio:

$$\frac{60}{24} - \frac{48}{24} = \frac{12}{24} = \frac{1}{2} \qquad 1$$

Plotting a line with slope ½ will then allow us to calculate the pulldown pattern. Clearly, for a line of slope ½ the Y coordinate is incremented once for every other step of the X coordinate. this is the expected result since we know that we display alternate film frames for 3 field times in order to perform 3⁄2 pulldown.

Our Patent Application No. 6B9415413.5 filed on Jul. 29, 1994 (abandoned) entitled 'Method and Apparatus for Video Decompression' describes a multi-standard video decoder and is incorporated herein by reference. the present invention can be implemented in relation to this decoder receiving the MPEG-2 standard.

Figure 2:
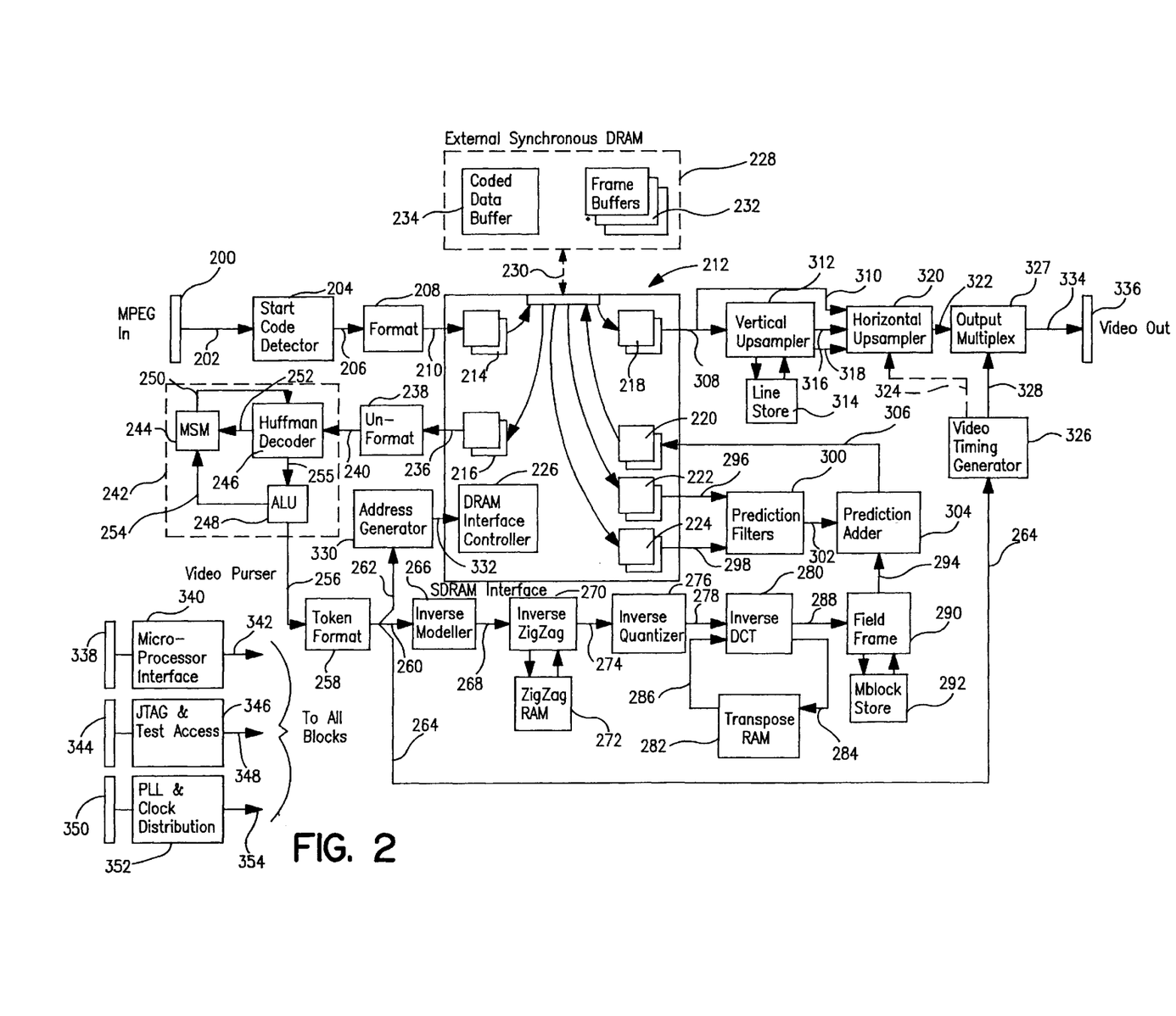
FIG. 2 is a block diagram illustrating the flow through a video decoder.

Referring to FIG. 2, in a preferred embodiment of the decoder described in the above patent application coded MPEG data (MPEG-1 or MPEG-2) is transferred into the device via a coded data input circuit 200. This data is then transferred via signals 202 to the Start Code Detector (SCD) 204. The SCD 204 recognizes a number of start codes which are unique patterns of bits, these are replaced by corresponding Tokens that may easily be recognized by subsequent circuitry. The remainder of the data (other than the start codes) is carried by a DATA Token. This stream of "start code" and DATA Tokens is transferred via signals 206 to formatting circuitry 208 that arranges the data into a suitable format for storage in external memory. This data is transferred via signals 210 to the Synchronous Dynamic Random Access Memory (SDRAM) interface circuitry 212.

The SDRAM interface circuitry 212 deals with a number of streams of data which are multi-plexed over a single set of interface signals 230 in order that they may be written to or read from the external SDRAM device (or devices) 228. In each case data is temporarily stored in a swing buffer (214, 216, 218, 220, 222, and 224) each comprising two separate RAM arrays. Addresses for the SDRAM are generated by the address generator 330 and transferred via signals 332 to the SDRAM interface circuitry 212 where they are further processed by the DRAM interface controller 226 before being applied via the SDRAM interface 230 to the external SDRAM 228. The address generation is such that such that a coded data buffer 234 and a number of framestores 232 are maintained in the external SDRAM.

The formatted stream of "start code" tokens and DATA tokens mentioned previously is transferred to the SDRAM interface circuitry 212 via the signals 210 where it is stored temporarily in the swing buffer 214. This data is written into the area of the external SDRAM 228 that comprises a Coded Data Buffer (CDB) 234. This buffer has the function of a FIFO (First In, First Out) in that the order of the data is maintained. Data returning from the CDB 234 is stored temporarily in the swing buffer 216 before leaving the SDRAM interface circuitry via signals 236. The data on the signals 236 is the same as that on the signals 210, except that it has been delayed by a (variable) time in the CDB 234.

The data returning from the CDB is unformatted in the circuitry 238 which undoes the formatting, suitable for storage in the external SDRAM, previously performed by the formatter 208. It should however be noted that there is no restriction that the bus width of the signals 206 be the same as the signals 240. In the preferred embodiment a wider bus width is used by the signals 240 in order that a higher instantaneous data bandwidth may be supported at this point then by the signals 206.

The data (still comprising the "start code" tokens and the remainder of the data carried as DATA tokens) is passed via the signals 240 to the video parser circuitry 242. This circuitry as a whole has the task of further processing the coded video data. In particular the structure of the video data is "parsed" in order that its component parts are identified. The video parser comprises a Microprogrammed State Machine (MSM) 244 which has a stored program. Instructions are passed via signals 250 to a Huffman decoder 246. some parts of the instruction are interpreted by the Huffman decoder 246. The remainder of the instruction, together with the data produced by the Huffman decoder is transferred via signals 255 to an Arithmetic and Logic Unit (ALU) 248. Here again some parts of the instruction are interpreted by the ALU itself whilst the remainder of the instruction and the data produced by the ALU are transferred via signals 256 to a Token Formatter 258. The Huffman decoder 246 can signal error conditions to the MSM 244 via the signals 252. The ALU 248 may feedback condition-codes to the MSM 244 via signals 254. This enables the MSM to perform a "JUMP" instruction that is conditional on data being processed in the ALU 248. The ALU includes within it a register file in order that selected information may also be stored. The "start code" tokens effectively announce the type of data (contained in the DATA tokens) that follow. This allows the MSM to decide which instruction sequence to follow to decode the data. In addition to this gross decision based on the Tokens derived from the start codes the finer structure of the video data is followed by the mechanism, previously described, of storing that information that defines the structure of the video data in the register file within the ALU and using this to perform conditional "JUMP" instructions depending on the value of the decoded data to choose alternative sequences of instructions to decode the precise sequence of symbols in the coded data.

The decoded data, together with the remaining instruction bits (that are not used by the Huffman Decoder) are passed via signals 256 to the Token Formatter 258. The data is formatted in response to the instruction bits, into Tokens, which can be recognized by subsequent processing stages. The resulting tokens are transferred to three separate destinations via the signals 260, 262, and 264. One stream of Tokens 262 passes to the Address Generator 330 where it is interpreted to generate suitable addresses to maintain the Coded Data Buffer and the framestores, as previously described. The second stream of Tokens 264 is interpreted by Video Timing Generation circuitry 326 in order to control certain aspects of the final display of decoded video information. A third stream of tokens 260 is passed to the Inverse Modeller 266 and on to subsequent processing circuitry. It should be understood that whilst each of the three streams of tokens (260, 262 and 264) is identical the information that is extracted is different in each case. Those Tokens that are irrelevant to the functioning of the specific circuitry are discarded. The tokens that are usefully interpreted in the cases of streams 262 and 264 are essentially control information while those usefully interpreted in the circuitry connected to the stream 260 may more usefully be considered as data.

The Inverse Modeller 266 has the task of expanding runs of zero coefficients present in the data so that the resulting data consists of blocks of data with precisely 64 coefficients, this is transferred via signals 268 to the Inverse Zig-Zag circuit 270. This circuit re-orders the stream of data according to one of two predefined patterns and results in data that might be considered two-dimensional. The Inverse Zig-Zag circuit includes a small Random Access Memory (RAM) 272 in which data is temporarily stored whilst being reordered. The resulting data is transferred via signals 274 to the Inverse Quantiser 276. Here the coefficients are unquantized and returned to their proper numerical value in preparation for an Inverse Discrete Cosine (DCT) function. The Inverse DCT is a separable transform so that it must be applied twice, once in a vertical direction and once in a horizontal direction. In this embodiment a single one dimensional Inverse DCT function is used twice to perform the full two dimensional transform. The data first enters an Inverse DCT circuit 280 via signals 278. The resulting data is transferred via signals 284 and stored in a Transpose RAM 282. The data is read out of the transpose RAM, but in a different order to that in which it was written in order that the data is transposed (i.e. rows and columns are swapped). This transposed data is transferred via signals 286 to the Inverse DCT 280 where it is processed a second time, the data resulting from this second transform being transferred via signals 288 to Field/Frame circuitry 290.

The Field/Frame circuitry again reorders data in certain cases such that the data that is transferred via signals 294 is in the same organization (Field or Frame) as that read as prediction data from the framestores in the external SDRAM. The Field/Frame circuitry 290 stores data temporarily in a RAM 292 for the purpose of this reordering.

Prediction data is read from the framestores that are maintained, as previously described, in the external SDRAM. Predictions are read via two paths (one nominally for "forward predictions" and the other nominally for "backwards predictions" although this is not strictly adhered to). One path comprises the swing buffer 222 and signals 296 whilst the other comprises the swing buffer 224 and signals 298. The data is filtered by the Prediction Filters 300 where the two predictions ("forward" and "backward" ) may be averaged if required by the particular prediction mode indicated for that data. The resulting prediction is transferred via signals 302 to a prediction adder 304 where it is added to the data transferred from the Field/Frame circuitry via the signals 294. The resulting decoded picture information is written back into a third framestore via signals 306 and the swing buffer 220.

In order to produce a video signal the decoded information is read from the SDRAM via the swing buffer 218 and is then transferred via one of two signal paths. The chrominance data is transferred via signals 308 to a vertical upsampler 312 which up-samples the data so that there are the same number scan lines as used for the luminance signal. The vertical upsampler 312 stores one scan line of each of the two chrominance signals in the line store 314. The two resulting chrominance signals (the blue color difference signal and red color difference signal) are transferred via signals 316 and 318 to a Horizontal upsampler 320. The luminance signal (that did not require vertical upsampling) is also transferred via signals 310 to the horizontal upsampler. The horizontal upsampler 320 has the task of resampling the data by one of a number of preset scale factors to produce a suitable number of pels for the final scan line. The scale factor is selected via signals 324 which are provided by the Video Timing Generation (VTG) circuitry 326. This information is simply extracted from one of the Tokens supplied to the VTG via signals 264.

The data produced by the horizontal upsampler is transferred via signals 322 to an Output Multiplex 327. The multiplexes the actual video data signal arriving via the signals 322 with synchronization, blanking and border information produced internally by the output multiplex in response to timing signals 328 generated by the Video Timing Generator (VTG) circuitry 326. In order for the correct timing signals to be generated, particularly in the aspect of generating the correct amount of border information, the VTG uses information transferred in Tokens via the signals 264.

The final resulting video signal, together with a number of strobes, synchronization and blanking signals are transferred via signals 334 to a video output interface 336. The video signal may then be transferred to some suitable video display device.

A number of other interfaces are provided. A microprocessor interface 340 enables an external microprocessor to be connected to the signals 338. Signals 342 connect to many of the blocks of circuitry allowing the current status of the video decoding device to be read by the eternal microprocessor. In addition, certain features may be controlled by the external microprocessor writing to various control registers via this interface.

A JTAG (Joint Test Action Group) interface 346 allows various aspects of the device to be controlled via an external device connected to signals 344. The JTAG interface 346 is often used only for printed circuit board testing (after assembly) in which it is only necessary to control the external signals of the video decoding device. In this embodiment additional test capability is provided and for this reason the JTAG interface 346 is connected via signals 348 to all blocks of circuitry.

Circuitry 352 is provided for the generation and distribution of clock signals 354 from the external clock signals 350. This includes various Phase Locked Loops (PLLs) that enable higher speed internal clocks to be generated from external lower speed clocks.

In the context of the video decoder described in the above patent application the display rate is known because of a configuration pin (NTSC/PAL) which indicates whether a 59.94 Hz or 50 Hz display raster is being produced. The film frame rate is transmitted in the MPEG-2 video stream as the frame-rate parameter.

In the normal course of events any progressive frame will be displayed for two field times. A bit in the PICTURE-TYPE token controls the repeating of the first field to make the frame display for three field times.

TABLE 1

| E | 7 | 6 | 5 | 4 | 3 | 2 | 1 | 0 |
|---|---|---|---|---|---|---|---|---|
| I 0 | I d | I x | I f | 0 p | I s | I s | I t | I t | where d double height (i.e., repeat frame into both fields)

x top_field_first (undefined in field pictures)

f repeat_first_field p progressive$_{frame}$ ss picture structure:
    00 Top field
    01 Bottom field
    10 Frame
    11 (not used)

tt picture type:
    00 I-picture
    0 P-picture
    10 B-Picture
    11 D-Picture The 'f' bit is set to '1' to repeat the first field. In the case that the sequence is interlaced, the 'f' bit in this token directly matches the 'repeat-first-field' bit in the MPEG-2 sequence. (This is the signal pulldown case). However, in the case that 'progressive-sequence' (as the term is defined in the MPEG standard) is 'one', indicating that the sequence is coded as a progressive sequence, local pulldown is enabled and the 'f' bit is calculated according to the algorithm described herein.

The algorithm is executed on the microprogrammable state machine (MSM) and is therefore specified in microcode (rather than the more familiar 'C' programme that illustrates the algorithm in the appendix hereto). The MSM is a 16-bit machine and this causes some minor complications because of the limited number range that can be represented in 16 bits.

This is dealt with by reducing the size of the denominator and numerator of the slope by common factors. In the example program given at the end of this document this is done by cancelling any common factor of 1001 and then dividing by 2 until either the numerator or the denominator is odd. Even this simple case yields numbers, dx and dy which will not exceed 16-bit number range as indicated by the 'min' and 'max' values shown in the results. In the said video decoder, the numbers dx and dy are precalculated and stored in tables that are indexed to determine the correct dx and dy values. As a result, the ratios can be further reduced by the smallest possible numerator and denominator as shown below:

TABLE 2

| Frame Rate (Hz) | Display Field Rate (Hz) | | | |
|---|---|---|---|---|
| | 50 | | 60000/1001 | |
| | Full Form | Reduced | Full Form | Reduced |
| 24000/ 1001 | $\frac{(50 \times 1001)}{24000} - 2$ | $\frac{41}{480}$ | $\frac{60000 \times 1001}{24000 \times 1001} - 2$ | $\frac{1}{2}$ |
| 24 | $\frac{50}{24} - 2$ | $\frac{4}{12}$ | $\frac{60000}{1001 \times 24} - 2$ | $\frac{498}{1001}$ |

TABLE 2-continued

| Frame Rate (Hz) | Display Field Rate (Hz) | | | |
|---|---|---|---|---|
| | 50 | | 60000/1001 | |
| | Full Form | Reduced | Full Form | Reduced |
| 25 | $\frac{50}{25} - 2$ | 0 | $\frac{60000}{1001 \times 25} - 2$ | $\frac{398}{1001}$ |
| 30000/1001 | Not Supported | | $\frac{60000 \times 1001}{30000 \times 1001} - 2$ | 0 |

The variable "d" is a decision variable which is updated at each x coordinate (or each film frame). At each x coordinate the ideal value of y (represented by the line in FIG. 1) lies between two pels (one black and one white). d is proportional to the difference between the distance to the upper pel and the distance to the lower pel.

If d is negative than the ideal line lies closer to the lower pel.

If d is positive then the ideal line lies closer to the upper pel.

At each x coordinate the algorithm must choose either the lower or upper pel and then update the value of d in readiness for the next x coordinate (next frame).

If d is negative, the lower pel is chosen. d is updated by adding on incr1. Since incr1 is positive d will become less negative reflecting the fact that the line will now be farther from the lower pel (at the next x coordinate) in value.

If d is positive, the upper pel is chosen. d is updated by adding on incr2. Since incr2 is negative d will become less positive reflecting the fact that the line will now be farther from the upper pel (at the next x coordinate).

incr1 and incr2 therefore represent the change in d (i.e., the change in the difference between the distance from the ideal notional line to the upper pel and the distance from the line to the lower pel) for the two possible decisions that the algorithm may take. Thus, having chosen a basic integer value of repetitions of the field in a frame period the notional slope of the notional line is determined in accordance with equation 1 from which the algorithm is used to decide whether to add a field repeat in a frame period or not to maintain the running average rate of the repetiton of fields at the faster field rate.

In the examples in Table 2 the basic integer value of repetitions of the field in a frame period is conveniently chosen as 2. Because of this repetitions of fields have to be added according to the pulldown pattern to maintain the running average. However, a basic integer value resulting in an overall excess of repetitions of the fields could be chosen, such that selected field repetitions are deleted according to the pulldown pattern established.

It will also be noted that, as an alternative to storing dx and dy in the table and calculating incr1 and incr2 it will be equally valid to store precalculated values of incr1 and incr2 in the table directly.

Figure 3:
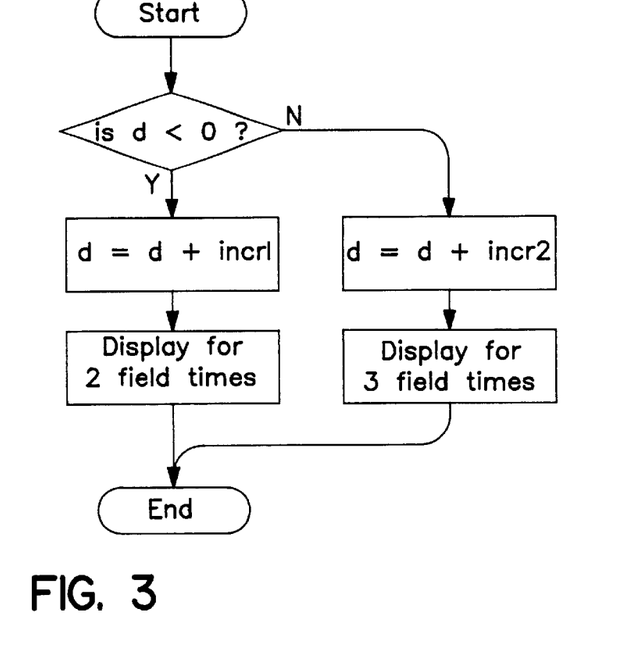
FIGS. 3 to 6 and flow charts of various aspects of the Invention.

FIG. 3 illustrates the procedure for decoding and displaying a field for an appropriate number of times.

Figure 4:
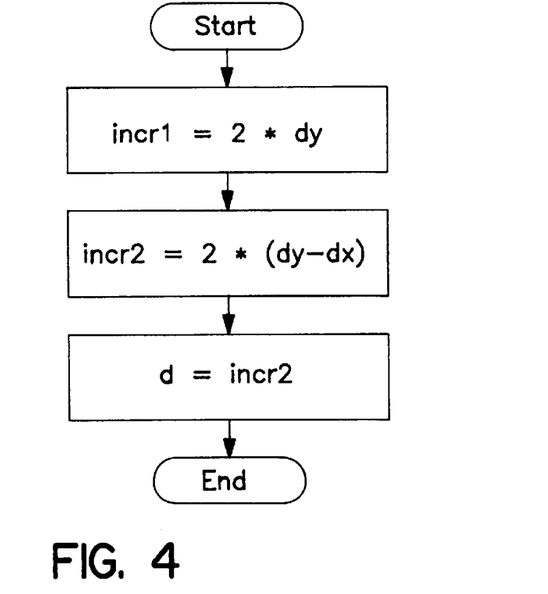

FIG. 4 shows an example algorithm to determine dx and dy from field-rate and frame-rate. In this example, values of field-rate and frame-rate that are larger than 1000 are interpreted as representing a multiple of 1001, e.g. a frame-rate of 24000 actually represents a frame rate of 24000/1001 Hz.

Figure 5:
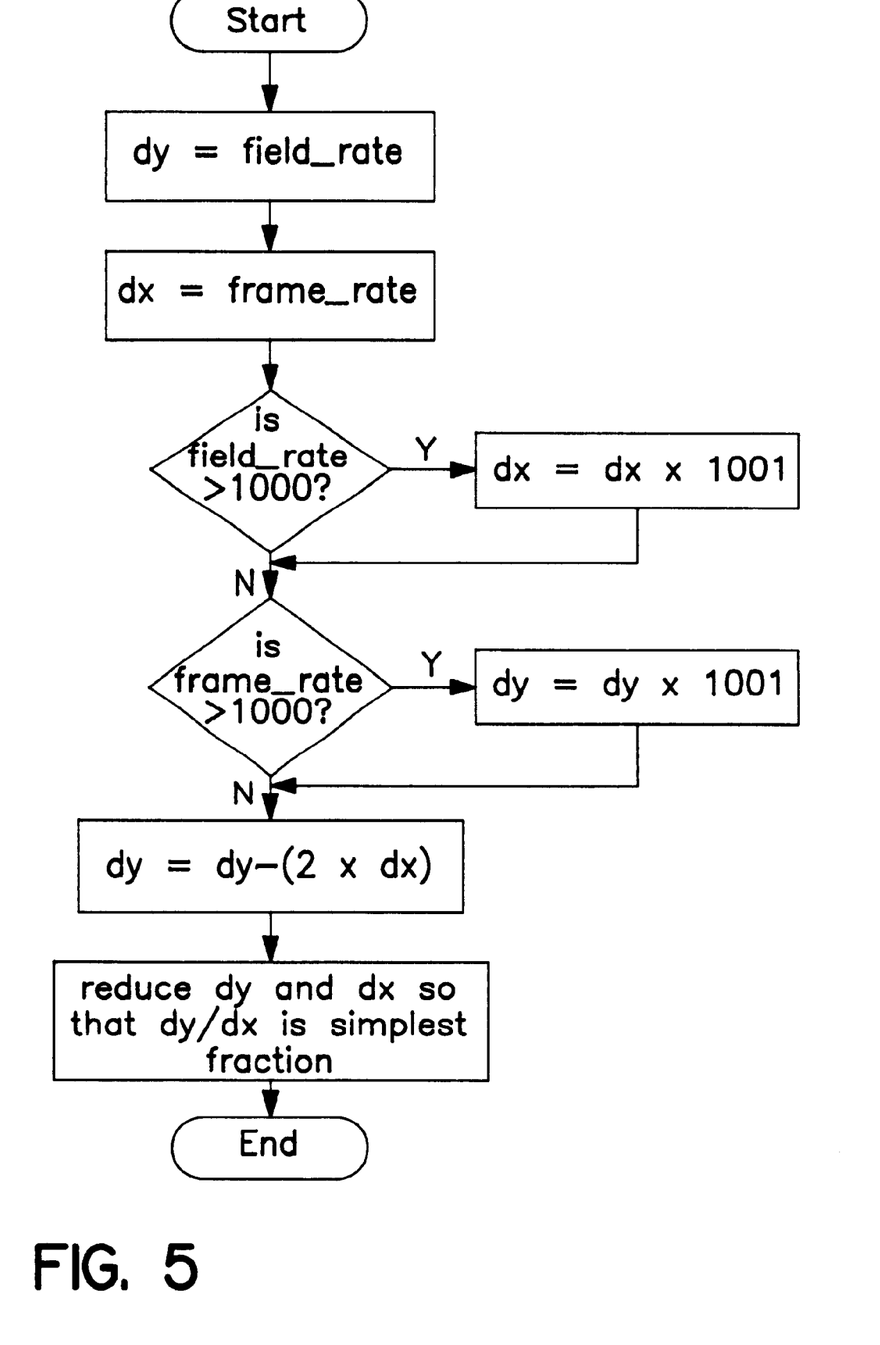

FIG. 5 shows an algorithm to initialize incr1, incr2 and d. The algorithm is used before the first frame. The values of dx and dy are integers such that the fraction dy/dx represents the "slope of the line".

Figure 6:
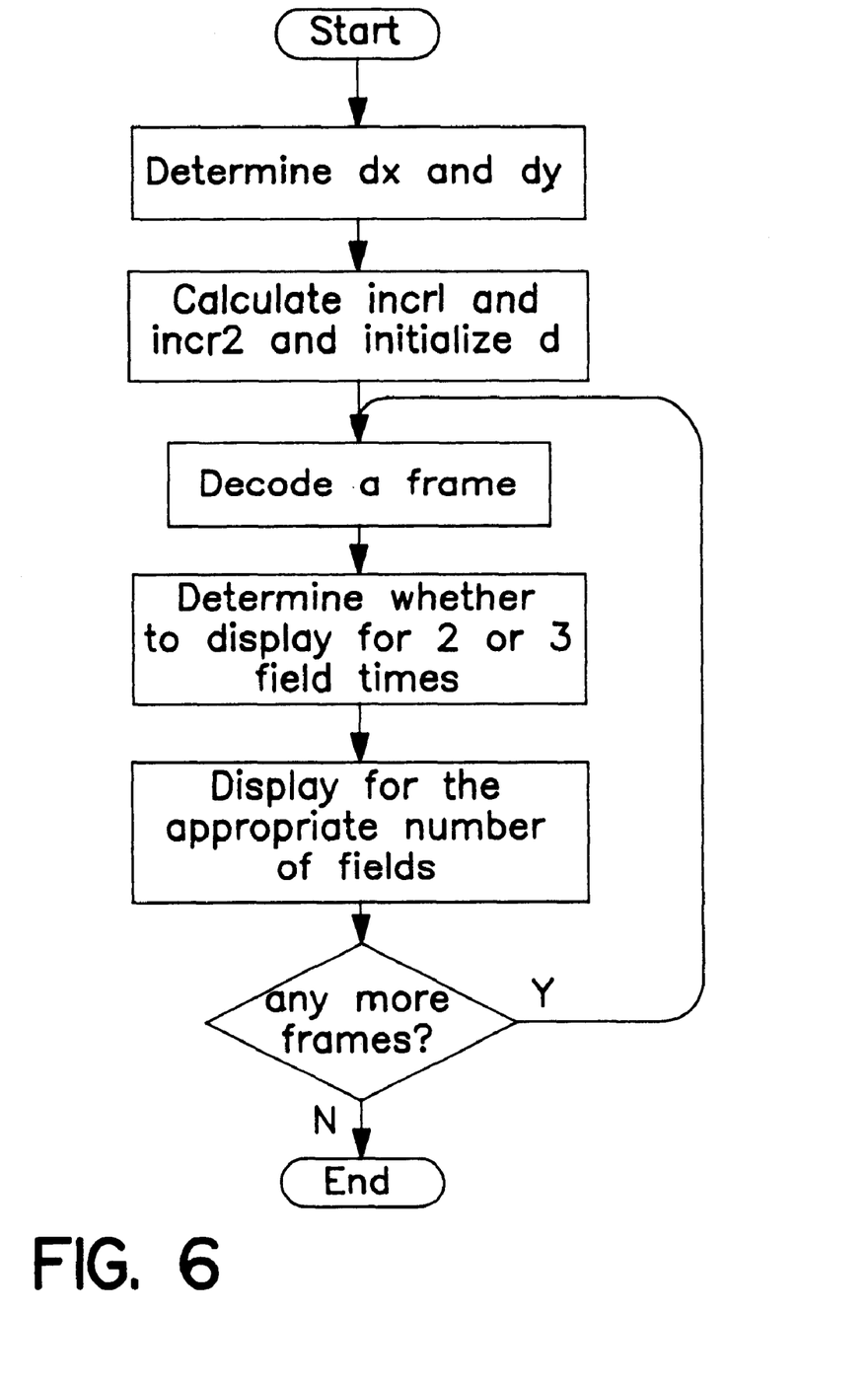

FIG. 6 shows an algorithm to determine whether to display a frame for two or three field times. The algorithm is used once for each frame. The values of incr1 and incr2 are those determined by the initialization algorithm. The value of d is that produced by this algorithm for the previous frame or the initial is a time algorithm in the case of the first frame.

The principal advantages of this method are:

1. All of the required pulldown conversions are performed using the same arithmetic.
2. Once the parameters dx and dy are known (and these can be stored in the table) no multiplications or divisions are required.
3. The algorithm works for arbitrarily long sequences of frames—none of the numbers grow indefinitely (which would eventually lead to number representation problems irrespective of the word width).
4. The frames which have the repeated field are distributed evenly throughout the sequence of frames.
5. Very little state needs to be maintained in order for the algorithm to operate. Just a current value of 'd' and probably INCR1 and INCR2 (although these could be recalculated or looked in a table each frame period).

The following procedure is Breshenham's line drawing algorithm. void breshenham(x 1, y1, x2, y2)

```
{
    int dx, dy, incr1, incr2, d, x, y, xend;
    dx = abs(x2-x1);
    dy = abs(y2-y1);
    d = 2 * (dy - dx);
    incr1 = 2 * dy;
    incr2 = d;
    if (x1 > x2)
    {
        x = x2;
        y = y2;
        xend = x1;
    }
    else
    {
        x = x1;
        y = y1;
        xend = x2;
    }
    printf ("(%d, %d)\n", x, y);
    while (x < xend)
    {
        x ++;
        if (d < 0)
            d += incr1;
        else
        {
            y ++;
            d += incr2;
        }
        printf("(%d, %d)\n", x, y);
    }
}
```

The following program shows the modified algorithm (as the procedure three_fields( )) to calculate which frames to display for three field-times. Each possible conversion is checked out by testing over one million film frames to ensure that the field rate does indeed approach the required value.

```c
#include <compiler.h>
#include <pddtypes.h>
#include <stdlib.h>
#include <stdio.h>
Boolean three_fields(int dx, int dy, int *d, Boolean initalise)
{
    int incr1, incr2, x, y, xend;
    int r = False;
    incr1 = 2 * dy;
    incr2 = 2 * (dy - dx);
    if (initalise)
    {
        *d = incr2;
    }
    else
    {
        if (*d < 0)
            *d += incr1;
        else
        {
            r = True;
            *d += incr2;
        }
    }
    return r;
}
double check_ratio(int dx, int dy, int limits[2])
{
    int d;
    int frame, field=0, num_frames=10000000;
    double ratio, field_rate;
    int three = 0, two = 0;
    (void) three_fields(dx, dy, &d, True );
    limits[0] = limits[1] = 0;
    if (d < limits[0]) limits[0]=d;
    if (d > limits[1]) limits[1]=d;
    for (frame = 0; frame < num_frames; frame++)
    {
        if ( three_fields (dx, dy, &d, False ) )
        {
            field +=3;
            three ++;
        }
        else
        {
            field += 2;
            two ++;
        }
        if (d < limits[0]) limits[0]=d;
        if (d > limits[1]) limits[1]=d;
    }
    ratio = ((double)field) / ((double) frame);
    return ratio;
}
static int frame_rates[] = /* input frame rates */
{
    -1,
    24000, /* numbers > 1000 express a numerator - denominator =
1001 */
    24,
    25,
    30000,
    30,
    50,
    60000,
    60,
    -1,-1,-1,-1,-1,-1,};
static int field_rates[] = /* output display rates */
{
    50, 60000
};
double real_rate (int rate)
{
    if (rate > 1000)
        return ((double) rate)/1001.0;
    else
        return ((double) rate);
}
void main (int argc, char **argv)
{
    int dx, dy, field_index, frame_index;
    int limits[2];
    double ratio, field_rate;
    for (field_index = 0; field_index < 2; field_index++)
    {
        for (frame_index = 1; frame_rates[frame_index] > 0;
            frame_index
++)
        {
            if ( (real_rate(frame_rates[frame_index]) *2.0) <=
                            real_rate(field_rates[field_index]) )
            {
                dy = field_rates[field_index];
                dx = frame_rates[frame_index];
                if ((field_rates[field_index] <= 1000) ||
                    (frame_rates[frame_index] <= 1000))
                /* NB if both have the 1001 then don't bother! */
                {
                    if (field_rates[field_index] > 1000)
                        dx * = 1001;
                    if (frame_rates[frame_index] > 1000)
                        dy * = 1001;
                }
                dy -= (2 * dx);
                /* limit ratio by dividing by two */
                while ( (((dx & 1)= =0) && ((dy & 1)= =0))
                {
                    dx >>= 1;
                    dy >>= 1;
                }
                ratio = check_ratio (dx, dy, limits);
                printf("output field rate = %d%s, input frame rate =
%d%s\n",
                    field_rates[field_index],
                    ((field_rates[field_index]>1000) ?
                        "/1001":""),
                    frame_rates[frame_index],
                    ((frame_rates[frame_index]>1000) ?
                        "/1001":"") );
                printf("dx = %d, dy = %d\n", dx, dy);
                field_rate = frame_rates[frame_index] * ratio;
                if(frame_rates[frame_index]>1000)
                    field_rate / = 1001.00;
                printf("ratio = %4.12g, field_rate = %4.12g\n", ratio,
field_rate);
                printf("(field_rate = %4.12g/1001)\n",
                    field_rate*1001);
                printf("min = %d, max = %d\n\n",
                    limits[0], limits[1]);
            }
        }
    }
}
```

The program of the preceding pages yields the following output:

output field rate=50, input frame rate=24000/1001 dx=12000, dy=1025 ratio=2.0854166, field$_{rate=}$49.9999984016

(field_rate=50049.9984/1001)

min=−21950, max=2000 output field rate=50, input frame rate=24 dx=12, dy=1 ratio=2.0833333, field rate=49.9999992

(field_rate=50049.9991992/1001)

min=−22, max=0 output field rate=50, input frame rate=25 dx=25, dy=0 ratio=2, field rate=50

(field$_{rate=}$50050/1001)

min=−50, max=0 output field rate=60000/1001, input frame rate=24000/1001
dx=750, dy=375
ratio=2.5, field rate=59.9400599401
(field_rate=60000/1001)
min=−750, max=0
output field rate=60000/1001, input frame rate=24
dx=3003, dy=1494
ratio=2.4975024, field_rate=59.9400576
(field_rate=59999.9976576/1001)
min=−3018, max=2982
output field rate=60000/1001, input frame rate=25
dx=25025, dy=9950
ratio=2.3976023, field$_{rate=}$59.9400575
(field$_{rate=}$59999.9975575/1001)
min=−30150, max=19850
output field rate=60000/1001, input frame rate=30000/1001
dx=1875, dy=0
ratio=2, field_rate=59.9400599401
(field_rate=60000/1001)
min=−3750, max=0

What is claimed is:

1. A method of converting frames of data received at a slower rate into fields of data generated at a faster rate, comprising the steps of:
   determining a basic integer number of repetitions of fields in a frame period;
   calculating a differential of the field repetition rate from the difference between the ratio of the faster to the slower rates and the ratio of the basic integer number of fields in the frame period to the slower frame rate;
   additionally repeating or deleting selected ones of the repeated fields, when the differential of the rate of repeating fields is at variance with the calculated differential of the field repetition rate, to maintain the repetition of the fields at the faster rate.

2. A method as claimed in claim 1 wherein the selected repetition rate is less than the faster field rate, the selected ones of the frames being additionally repeated.

3. A method as claimed in claim 1 wherein the selected repetition rate is faster than the faster field rate, the selected ones of the repeated frames being additionally deleted.

4. A method as claimed in claim 1 wherein the basic integer number of repetitions of fields in a frame period is 2.

5. A method as claimed in claim 1 wherein the calculation and addition or deletion of selected ones of the repeated fields is conducted according to Breshenham's algorithm.

6. Apparatus for converting frames of data received at a slower rate into fields of data generated at a faster rate, the apparatus comprising:
   means for determining a basic integer number of repetitions of fields in a frame period;
   means for calculating a differential of the field repetition rate from the difference between the ratio of the faster to the slower rates and the ratio of the basic repetition number of fields in the frame period to the slower frame rate;
   means for additionally repeating or deleting selected ones of the repeated fields, when the differential of the rate of repeating fields is at variance with the calculated differentials of the field repetition rate, to maintain the repetition of the fields at the faster rate.

7. Apparatus as claimed in claim 6, further comprising means for generating a repeat or delete frame signal for actuating the means for repeating or deleting the selected ones of the repeated frames.

* * * * *